(12) United States Patent
Obregon et al.

(10) Patent No.: US 6,736,922 B2
(45) Date of Patent: May 18, 2004

(54) CONSUMABLE STAPLE REFILL

(75) Inventors: Roberto Obregon, Jalisco (MX); Marina M. Talavera, Jalisco (MX)

(73) Assignee: Hewlett-Packard Development Company, L.P., Houston, TX (US)

(*) Notice: Subject to any disclaimer, the term of this patent is extended or adjusted under 35 U.S.C. 154(b) by 273 days.

(21) Appl. No.: 09/975,452

(22) Filed: Oct. 11, 2001

(65) Prior Publication Data

US 2003/0072637 A1 Apr. 17, 2003

(51) Int. Cl.[7] ................................................. B32B 31/12
(52) U.S. Cl. .................. 156/247; 156/296; 156/344; 59/77; 227/120; 227/156
(58) Field of Search ................................. 156/247, 296, 156/344; 59/77; 227/120, 156

(56) References Cited

U.S. PATENT DOCUMENTS 2,943,436 A * 7/1960 Peterssen ........................ 59/77
4,993,616 A * 2/1991 Yoshie et al. ................ 227/120
6,548,135 B1 * 4/2003 Hershey et al. ............. 428/40.1

* cited by examiner

*Primary Examiner*—Sam Chuan Yao

(57) ABSTRACT

The present invention is directed to a system and method for building a consumable part refill, which may be a staple refill, the method comprising the steps of fabricating an array of consumable parts detachably connected along a first direction, stacking a plurality of such fabricated arrays of parts, or staple wire plates, along a second direction, and providing an adhesive bond between adjacent ones of this stacked plurality of arrays.

6 Claims, 4 Drawing Sheets

CONSUMABLE STAPLE REFILL

BACKGROUND

Automated office devices, such as copiers, commonly employ machine components which perform helpful functions in addition to a main task, such as, for instance, automatically stapling a number of copied sheets together. Accordingly, the provision of economical, reliable, and efficient mechanisms for performing such subsidiary functions, and of consumable components used by such mechanisms, is generally desirable in order to provide a beneficial service to the machine as a whole. One such mechanism is an automatic stapler.

One prior art approach to providing staples in a manner suitable for automatic stapling within a copy machine, or copier, is the insertion of container of staples which is placed within the copier so as to make the individual staples available to automatic stapling equipment within the copier. Generally, upon consuming all the staples within a container, the container is removed and disposed of. The discarding of used staple containers in this manner generally causes the expense associated with the production and disposal of one staple container to be incurred every time one container's worth of staples is consumed by the copier. Moreover, an environmental cost is experienced, since a considerable number of containers will either be discarded completely, or recycled, over the operating life of a copy machine.

An alternative approach involves using plates of staple wire which are stacked and bound using a paper tie. Ideally, a human operator first securely inserts the bound stack of staple wire plates into a copier and then removes the paper tie to allow the plates to be moved with respect to each other within the copier to enable automatic stapling to occur. However, this approach is subject to a human operator occasionally forgetting to remove the paper tie, thereby disabling the advancement of staple wire plates for automatic stapling. Another problem experienced with this approach is that some human operators elect to remove the paper tie prior to inserting the vertically stacked staple wire plates into a copier which may cause the plates fall into disarray. Thereafter, it can be quite difficult to reorder the plates so as to properly position and secure them within a copy machine staple refill contained.

Therefore, it is a problem in the art that ties used to bind staple wire plates together may disable operation of an automatic stapling operation if not properly removed from a copy machine prior to initiating operation thereof.

It is a further problem in the art that prematurely removing a tie binding staple wire plates together may hinder the proper placement of such staple wire plates in a copy machine.

SUMMARY OF THE INVENTION

The present invention is directed to a system and method for building a consumable part refill, which may be a staple refill, the method comprising the steps of fabricating an array of consumable parts, detachably connected along a first direction, stacking a plurality of such fabricated arrays of parts, or staple wire plates, along a second direction, and providing an adhesive bond between adjacent ones of this stacked plurality of arrays.

DETAILED DESCRIPTION

Figure 1:
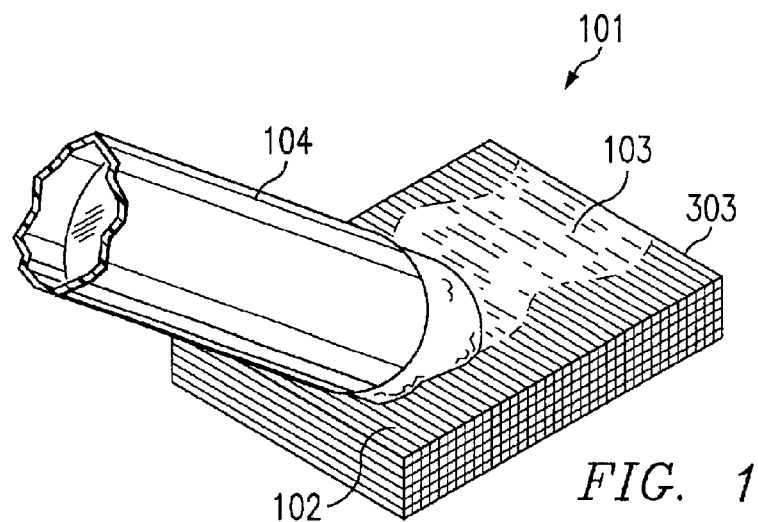
FIG. 1 is an isometric view of the application of adhesive to the upper surface of the uppermost sheet of a stack of staple wire sheets according to a preferred embodiment of the present invention.

The present invention is directed to a system and method for providing a waste-free refill of consumable parts for use within a machine. When providing a staple wire refill for a copy machine, the inventive approach involves inserting a package of staple wires bound together by a mechanism, such as a fastener, which is preferably entirely consumed in the stapling process, thereby obviating a need to remove waste material, such as a disposable staple container, from such copy machine subsequent to insertion of such a refill.

In a preferred embodiment, a staple refill or package is mechanically bonded together along a first dimension, such as through the use of a preferably brittle glue or a perforated metal connection, and bonded along a second dimension through the use of glue or other adhesive. Preferably, the glue or other adhesive used is consumed and/or expelled from the copy machine during the stapling process so as to avoid having to perform any material removal from such copy machine or other device.

In a preferred embodiment, a plurality of sheets of staple wires is stacked vertically, horizontally, or in yet another orientation. Preferably, each sheet within such stack is bonded to adjacent sheets on both of its surfaces. An exception generally applies for sheets on either end of the stack, which would generally be bonded only to only one adjacent sheet. Preferably, the staple wires within one staple sheet are bonded to each other using preferably brittle glue which glue is left intact from the initial production of such staple sheet.

In a preferred embodiment, bonding along a second dimension would involve bonding staple wire plates together, after production of such plates, using glue or other adhesive which is either consumed and/or expelled from a copy machine or other host device as a consequence of the stapling process. Elimination of the glue or other adhesive residue from a copy machine stapling mechanism may occur by fragmenting the glue during each stapling operation and then expelling the fragmented glue residue from the stapling mechanism onto the paper or other media being stapled. Alternatively, heat could be employed to burn off the adhesive such that no expulsion of glue from the host device is needed. Alternatively, glue removed from the staples could be directed into a waste container which is periodically emptied by an operator. Moreover, a combination of physical fragmentation, heat, and material removal could be employed, and all such variations are intended to be included within the scope of the present invention.

In a preferred embodiment, adhesive used for bonding the staple wire plates together is strong enough to hold the plates together while being manually handled, during placement into a stapling mechanism, and for a period leading up to consumption of staple wires within a refill or package of staple wires. Furthermore, the same adhesive is preferably weak enough to allow the plates to readily separate once appropriate separation force is applied to one plate of a refill, the remainder of the refill, or both a plate and a remainder of the refill at once. Such separating force is preferably applied in order to advance the wires within a selected plate toward a stamping mechanism for adhering individual staples to paper or other appropriate media.

While the above discussion has primarily been directed to the use of the inventive consumable part bonding mechanism in conjunction with automatic copy machines, it will be appreciated that other office equipment such as fax machines and scanners may also be used in conjunction with the present invention. Moreover, manually operated devices as well as automatic devices may employ the inventive part bonding mechanism, and all such variations are included within the scope of the present invention. The inventive mechanism is not limited to bonding staples together but may be applied to paper clips, pins, and any other consumable parts formed into stacks or packages which store parts employing a repetitive pattern of closely spaced parts configured for use in a consuming device such as a stapler.

Therefore, it is an advantage of a preferred embodiment of the present invention that stacked staple wire plates are sufficiently strongly bonded together so as to prevent separation of such plates prior to activation of an appropriate advancement mechanism within a staple machine.

It is a further advantage of a preferred embodiment of the present invention that human operator intervention is generally not needed for the purpose of material removal after a staple wire refill has been inserted into a staple machine.

It is a still further advantage of a preferred embodiment of the present invention that any residue from material used to bond together components of a staple wire refill is either consumed or expelled from a copy machine or other host device through normal operation of the stapling mechanism of such host device.

FIG. 1 is an isometric view 101 of the application of adhesive 103 to the upper surface of the uppermost sheet 102 of refill 303 preferably consisting of a stack of staple wire sheets according to a preferred embodiment of the present invention.

In a preferred embodiment, staple wire sheets, such as staple wire sheet 102, consist of a plurality of wires joined to each other along a direction parallel to the axis of each wire. Preferably, the connection between wires forming staple wire sheet 102 is established during manufacture of sheet 102 and consists of individual wires bonded to adjacent wires by means of a preferably brittle glue. Preferably, the connection formed by the preferably brittle glue is easily ruptured when removal of individual staple wires is desired, without inflicting any damage upon staples remaining within sheet 102.

For example, where staple wires are removed from sheet 102 by stamping or forming a wire located at a leading edge of sheet 102 into a "U"-shaped staple, and simultaneously, or soon thereafter, affixing such formed staple to paper or other media, such forming or stamping is preferably completed without damaging or distorting the shape of a remainder of sheet 102. Additionally or alternatively to employing glue to provide a detachable connection between individual staple wires connected to form staple wire sheet 102, perforations may be employed along a connecting edge between adjacent wires within wire sheet 102, and all such variations are intended to be included within the scope of the present invention.

In a preferred embodiment, a plurality of staple wire plates, such as staple wire plate 102, are stacked together to form a staple package or staple refill (such as staple refill 303) for insertion into a staple machine or other host device in order to adequately provision such host device for a substantial number of stapling operations. One embodiment of such a refill is that of a substantially cube-shaped structure such as refill 303 shown in FIG. 3. The effective deployment of such a refill 303 preferably involves providing a package of staples which can be handled by a human operator, placed in a stapling machine or other host device, and processed in such host device while maintaining the mechanical integrity of the cube structure, or other geometric form of refill 303, until a stapling operation requires the removal of one staple wire from a sheet 102 and/or the separation of one sheet 102 from the refill 303 as a whole.

In a preferred embodiment, the various staple wire sheets, such as sheet 102, are glued or adhered to adjacent sheets in refill 303 to provide mechanical integrity to such refill during manual and machine handling of refill 303. The strength of adhesion provided between adjacent sheets is preferably selected so as to be strong enough to prevent plates, such as plate 102, from being unintentionally separated from the remainder of refill 303 during manual handling of refill 303, but weak enough to permit separation of one plate from a remainder of refill 303 by an appropriate advancement mechanism without deforming a remainder of refill 303. One commercially available adhesive which has been found effective for this purpose is PRITT® glue, provided in solid, "rub-on" form, and available from HENKEL®. However, other types of solid stick rub-on glue may be employed, and all such variations are intended to be included within the scope of the present invention.

It will be appreciated that the present invention could be practiced employing a range of different adhesive mechanisms including various brands of solid and liquid glue. Moreover, attachment means other than glue, including mechanical clips, mechanical clamps, as well as electrical, magnetic, and/or electromechanical mechanisms could be employed to provide a fully consumable refill of staple wires or other package of consumable parts, so long as the binding mechanism is consumed or expelled during operation of the consuming machine.

In a preferred embodiment, applicator 104 is moved across an exposed surface of staple wire plate 102 so as to provide a quantity of adhesive which will provide a bond strong enough to preserve the mechanical integrity of a fully constructed staple wire refill 303. Full coverage of the surface of a plate, such as plate 102, may not be needed depending upon the strength of deposited adhesive 103. For strong adhesives, partial coverage of plate 102 may suffice. For weaker adhesives, complete coverage of plate 102 with adhesive material may be desirable. In a preferred embodiment, the application of adhesive to surfaces of the various staple wire plates may be automated in order to supply adhesive material in a more rapid, more consistent, and more cost effective manner.

Figure 2:
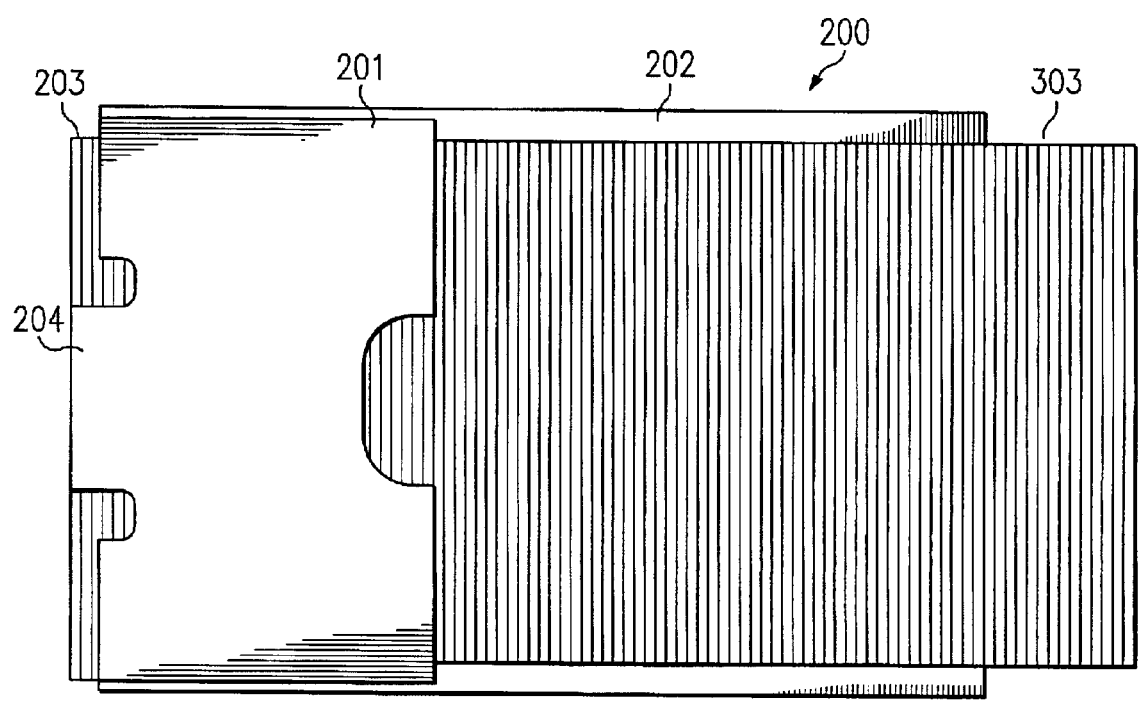
FIG. 2 is a bottom view of a staple refill placed in a staple cartridge according to a preferred embodiment of the present invention.

FIG. 2 shows refill 303 disposed within cartridge 200. Forming plate 201 is shown on the left portion of the FIGURE. Section 202 is preferably a structural component of cartridge 200.

In a preferred embodiment, wire 203 of the bottom plate of refill 303 is substantially aligned with narrowed portion 204 of forming plate 201. During each stapling cycle, a forming tool (not shown) is moved towards staple 203 and narrow portion 204 of forming plate 201. Proper engagement of the forming tool with forming plate 201 preferably causes staple 203 to be formed into a "U" shape in preparation for the insertion of the newly formed staple into paper or other appropriate media. In this manner, staple 203 is preferably detached from the bottom staple layer or plate of staple refill 303, by the operation of the forming tool (not shown), without significantly disturbing a remainder of refill 303.

Figure 3:
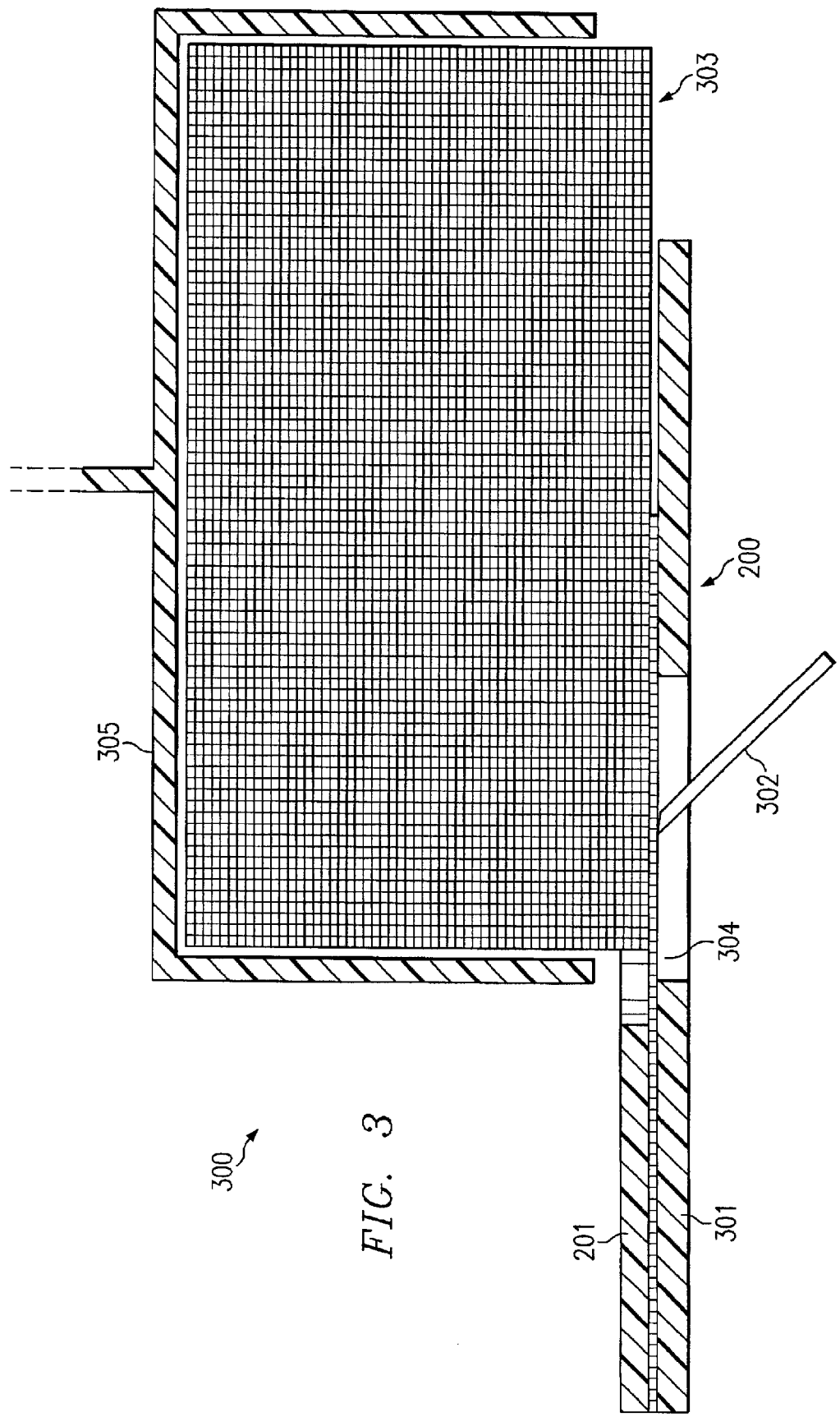
FIG. 3 is a cut-away view of the advancement of the lowest sheet of a staple refill by an advancement mechanism according to a preferred embodiment of the present invention.

FIG. 3 presents a side view 300 of staple refill 303 placed on cartridge 200 according to a preferred embodiment of the present invention. Blade 302 preferably operates to advance plate or layer 304 by a measured amount for each stapling cycle, thereby pushing an end of plate 304 in between forming plate 201 and guiding plate 301. The advancement of plate 304 preferably continues until all staples within plate 304 have been formed and driven into paper or other media. At that point, the plate adjacent plate 304, within refill 303, is preferably advanced towards forming plate 201 and guiding plate 301 as discussed above for plate 304. In a preferred embodiment, case 305 operates to restrain the movement of staple refill 303 during operation of blade 302 for the purpose of advancing plate 304.

Figure 4:
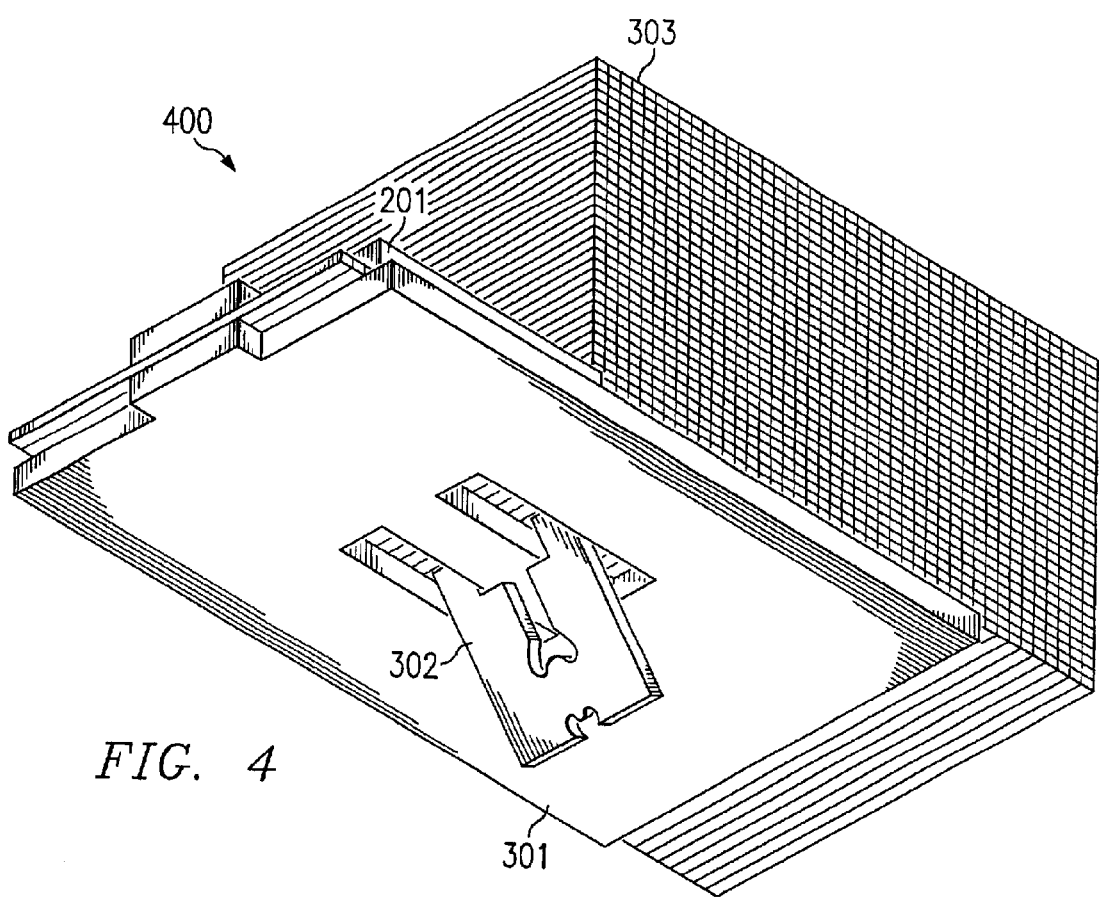
FIG. 4 is an isometric view of the bottom of a staple refill coupled to an advancement mechanism according to a preferred embodiment of the present invention.
Figure 5:
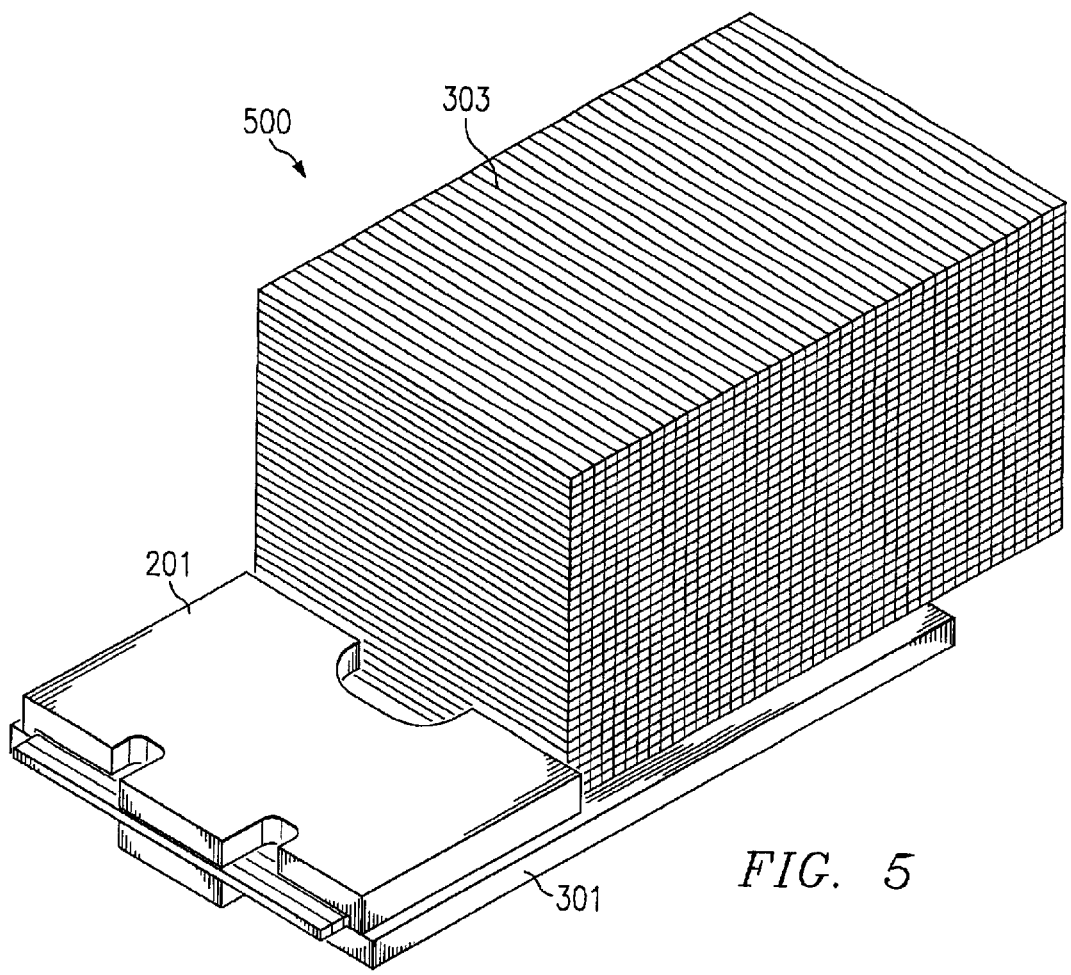
FIG. 5 is an isometric view of the top of a staple refill coupled to an advancement mechanism according to a preferred embodiment of the present invention.

FIG. 4 depicts an isometric view 400 of the same equipment shown in FIG. 3. FIG. 5 depicts an isometric view 500, from above, of the equipment shown in FIG. 3.

Figure 6:
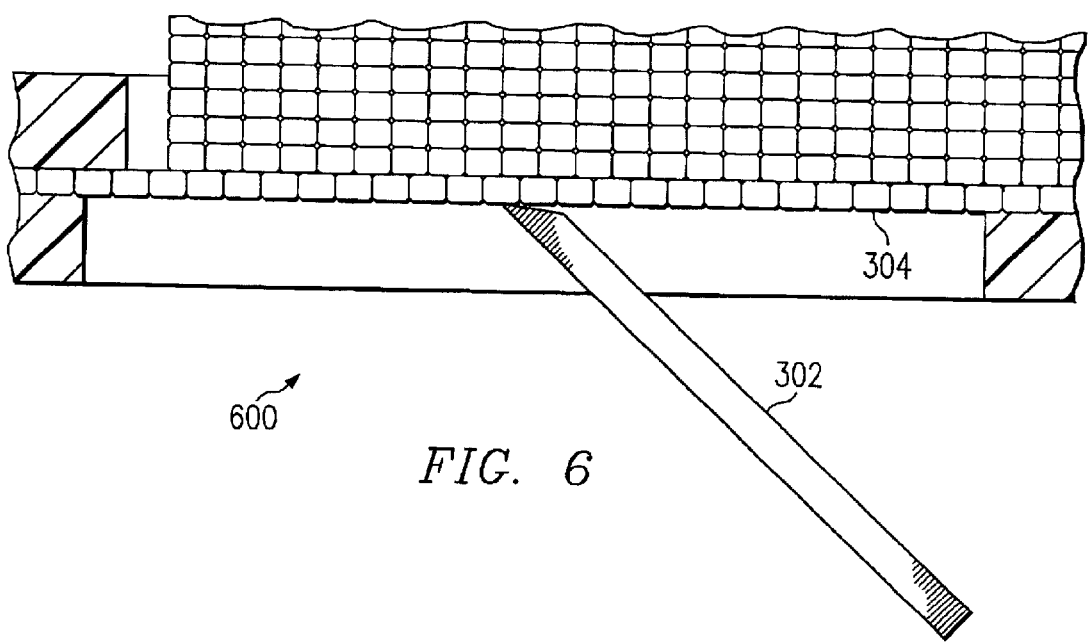
FIG. 6 is a close up cut-away view of the advancement of the lowest sheet of a staple refill according to a preferred embodiment of the present invention.

FIG. 6 is a close up view 600 of the subject matter of FIG. 3. It may be observed that in a preferred embodiment of the invention, when blade 302 moves to one side, for example toward the left, the angle of attack of blade 302 with respect to lowest plate 304 is such as to impart enough force to break the adhesive bond between plate 304 and the immediately adjacent plate, which is preferably above plate 304. Blade 302 thereby preferably causes plate 304 to move to one side, for example, to the left, with the movement of blade 302. However, when blade 302 is moved to the other side, for example to the right, the angle of attack is such as to impart very little if any force to blade 302.

What is claimed is:

1. A method for building a staple blank refill, the method comprising the steps of:
    fabricating a plurality of arrays of staple wires detachably connected along a first direction;
    stacking said plurality of said fabricated arrays of staple wires along a second direction; and
    providing an adhesive bond between adjacent ones of said stacked plurality of arrays.

2. The method of claim 1 wherein said fabricating step comprises the step of:
    providing a perforated connection between said staple wires.

3. The method of claim 1 wherein said step of providing an adhesive bond comprises the step of:
    adhering adjacent ones of said plurality of arrays using solid rub-on glue.

4. The method of claim 1 further comprising the step of:
    selecting a strength of said adhesive bond so as to allow separation of an array from an adjacent array only upon experiencing an application of force from an array advancement mechanism.

5. The method of claim 1 further comprising the step of:
    omitting an attachment to said adhered plurality of arrays of any material requiring removal prior to consumption of said staple wires in a host device.

6. The method of claim 1 further comprising the step of:
    destroying the adhesive bond during consumption of the staple wires.

* * * * *